United States Patent
Tsengas

(10) Patent No.: US 10,159,220 B1
(45) Date of Patent: Dec. 25, 2018

(54) INTERACTIVE PET TOY

(71) Applicant: OurPet's Company, Fairport Harbor, OH (US)

(72) Inventor: Steven Tsengas, Fairport Harbor, OH (US)

(73) Assignee: OURPET'S COMPANY, Fairport Harbor, OH (US)

( * ) Notice: Subject to any disclaimer, the term of this patent is extended or adjusted under 35 U.S.C. 154(b) by 130 days.

(21) Appl. No.: 15/156,575

(22) Filed: May 17, 2016

Related U.S. Application Data

(60) Provisional application No. 62/166,163, filed on May 26, 2015.

(51) Int. Cl.
*A01K 29/00* (2006.01)
*A01K 15/02* (2006.01)

(52) U.S. Cl.
CPC .......... *A01K 15/025* (2013.01); *A01K 15/024* (2013.01)

(58) Field of Classification Search
CPC .... A01K 15/025; A01K 15/026; A01K 15/02; A01K 5/0114
See application file for complete search history.

(56) References Cited

U.S. PATENT DOCUMENTS

| | | | | |
|---|---|---|---|---|
| 2,086,631 A * | 7/1937 | Munro | A63H 33/00 119/711 |
| 5,191,856 A * | 3/1993 | Gordon | A01K 15/025 119/711 |
| 5,390,629 A * | 2/1995 | Simone | A01K 15/025 119/711 |
| 5,778,825 A * | 7/1998 | Krietzmen | A01K 15/025 119/708 |
| 5,819,690 A * | 10/1998 | Brown | A01K 5/0114 119/707 |
| 5,870,971 A * | 2/1999 | Krietzman | A01K 15/025 119/707 |
| 6,158,391 A * | 12/2000 | Simonetti | A01K 5/0114 119/702 |
| 6,237,538 B1 * | 5/2001 | Tsengas | A01K 5/0114 119/707 |
| 6,405,682 B1 * | 6/2002 | Simon | A01K 15/025 119/707 |
| 6,415,741 B2 * | 7/2002 | Suchowski | A01K 15/026 119/709 |
| 2002/0174838 A1 * | 11/2002 | Crane | A01K 15/025 119/707 |
| 2004/0237905 A1 * | 12/2004 | Tsengas | A01K 15/025 119/711 |

* cited by examiner

*Primary Examiner* — Trinh T Nguyen
(74) *Attorney, Agent, or Firm* — John D Gugliotta

(57) ABSTRACT

An interactive pet toy is provide having a housing body in the form of a thread spool or plastic egg configuration having a cylindrical center forming a containment volume in which an interactive sound element may be contained. The outer surface of the cylindrical center may be covered with a tactile sleeve formed of carpet, fabric, sisal, corrugated cardboard, jute, sea grass, cork, or similar material known to function as claw scratcher elements. Catnip or similar attractant may further be incorporated into the sleeve as a composite material. A sound unit is secured to the housing. The sound unit sounds a noise when the toy is manipulated by the user. The instant abstract is neither intended to define the invention disclosed in this specification nor intended to limit the scope of the invention in any way.

18 Claims, 17 Drawing Sheets

INTERACTIVE PET TOY

RELATED APPLICATION

The present application claims benefit of U.S. Provisional Application 62/166,163, filed on May 26, 2015 and incorporated by reference as if fully rewritten herein.

BACKGROUND OF THE INVENTION

1. Field of the Invention

The invention relates generally to a toy for a pet, and, more particularly, to such a toy that can create an interactive stimulus while generating sound when manipulated.

2. Description of the Related Art

Cats, dogs and other pets play with many types of toys by swatting, pushing and carrying them about. Most pets seem to prefer a toy which acts to stimulate them into engagement or reacts to their interaction. Accordingly, efforts have recently centered on developing interactive pet toys which stimulate and/or react to the animal.

Empirically it has been noticed that some common items stimulate pets toward interaction. Items such as thread spools and plastic Easter eggs, for whatever reason, seem to create a stimulation in these pets and in response to this many pet owners have recycled the use of such items as pet toys. However, in that such items are not specifically manufactured to be pet toys, they may not be safe in their size, construction, materials, etc. Consequently, a need exists for additional improved pet toy designs which are visually similar in appearance to common household items.

SUMMARY OF THE INVENTION

Therefore, it is an object of the present invention to provide an improved interactive pet toy.

It is a feature of the present invention to provide interactive pet toys that are visually similar in appearance to common household items, especially those common household items known to generate interest in domestic pets.

Briefly described according to one aspect the invention an interactive pet toy is provide having a housing body in the form of a thread spool configuration having a cylindrical center terminated at each end by a disc flange. The cylindrical center forms a containment volume in which an interactive sound element may be contained. Additionally, attractants such as catnip or the like may be placed within and dispensed from the containment volume. The outer surface of the cylindrical center may be covered with a tactile sleeve formed of carpet, fabric, sisal, corrugated cardboard, jute, sea grass, cork, or similar material known to function as claw scratcher elements. Catnip or similar attractant may further be incorporated into the sleeve as a composite material.

Briefly described according to another aspect the invention an interactive pet toy is provide having a housing body in the form of an egg-like configuration having a cylindrical center terminated at each end by a hemispherical dome. The cylindrical center forms a containment volume in which an interactive sound element may be contained. Additionally, attractants such as catnip or the like may be placed within and dispensed from the containment volume. The outer surface of the cylindrical center may be covered with a tactile sleeve formed of carpet, fabric, sisal, corrugated cardboard, jute, sea grass, cork, or similar material known to function as claw scratcher elements. Catnip or similar attractant may further be incorporated into the sleeve as a composite material.

It is an advantage of the present invention to provide an improved pet toy design which will generate an interactive response from a pet.

It is another advantage of the present invention to provide a toy suitable for use with different animals, including dogs, cats and small mammals.

It is another advantage of the present invention to provide such a device wherein the outer surfaces of the device can be made of durable materials to resist animal chewing.

It is yet another advantage of the present invention to provide improved pet toys which provides auditory stimulation interactive with its use.

It is still another advantage of the present invention to provide an interactive pet toy game that is attractive to both young and old pets, and that maximizes interaction with the pet.

Other objects, advantages and features will be in part apparent and in part pointed out hereinafter.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENT

1. Detailed Description of the Figures

Figure 1:
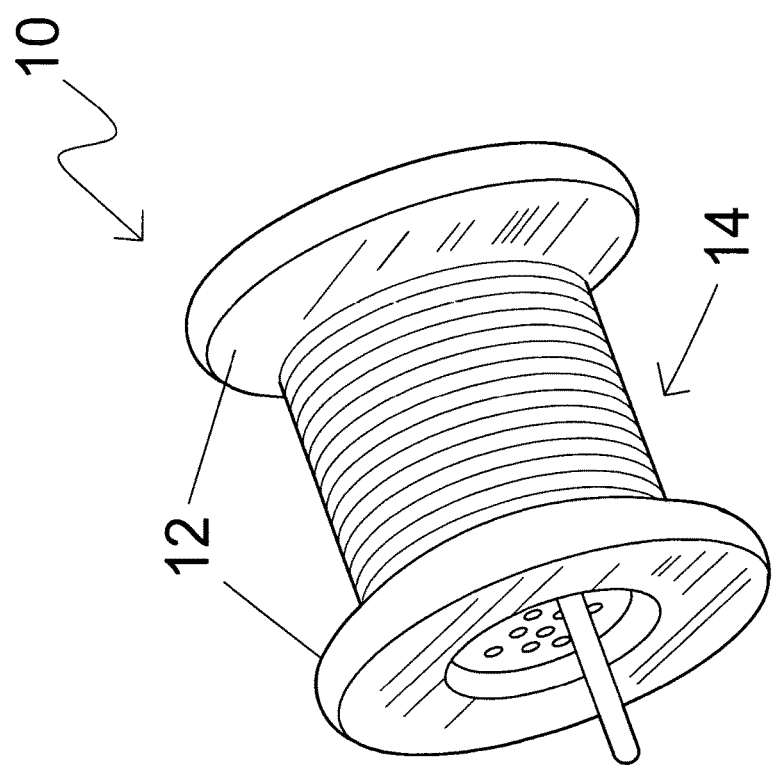
FIG. 1 is a top perspective view of a pet toy according to a preferred embodiment of the present invention.
Figure 2:
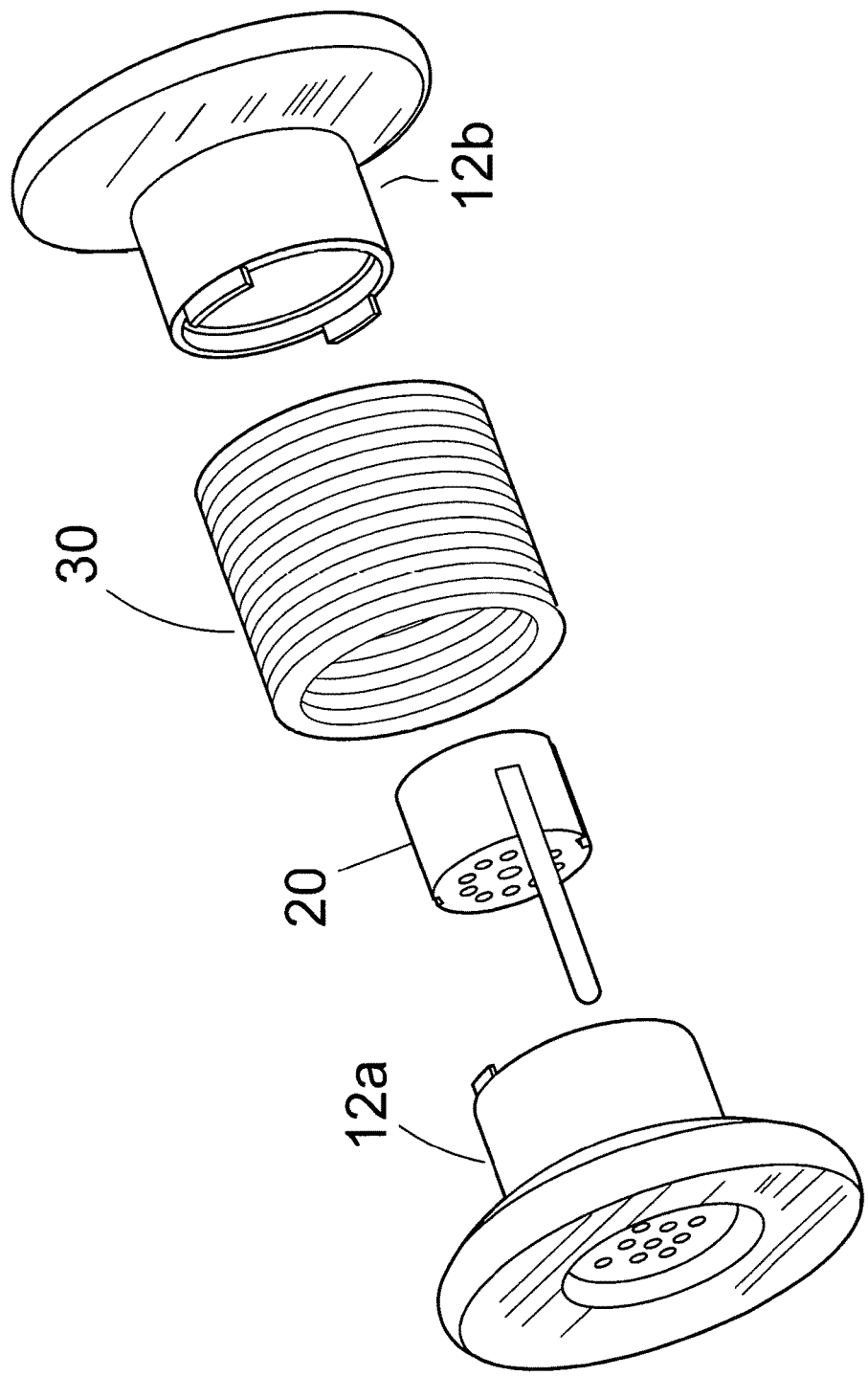
FIG. 2 is an exploded perspective view thereof.
Figure 3:
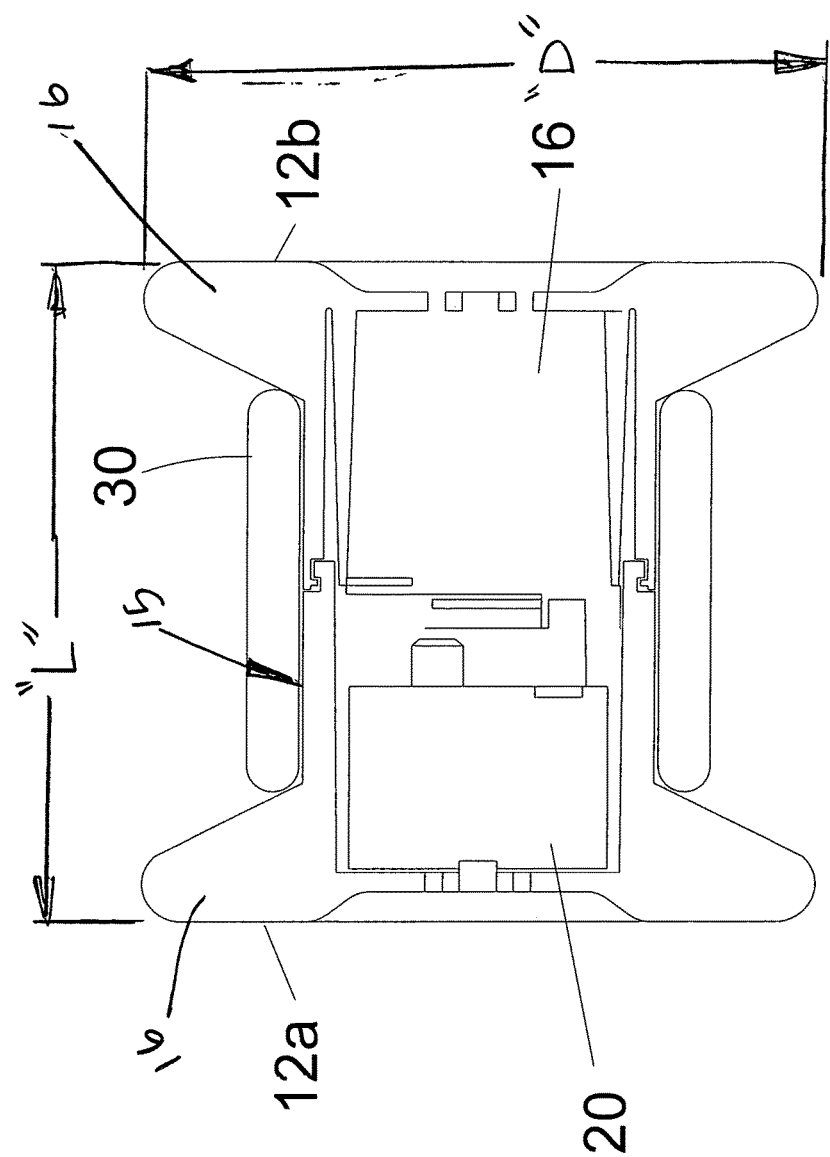
FIG. 3 is a cross sectional view taken along a linear centerline thereof.
Figure 4:
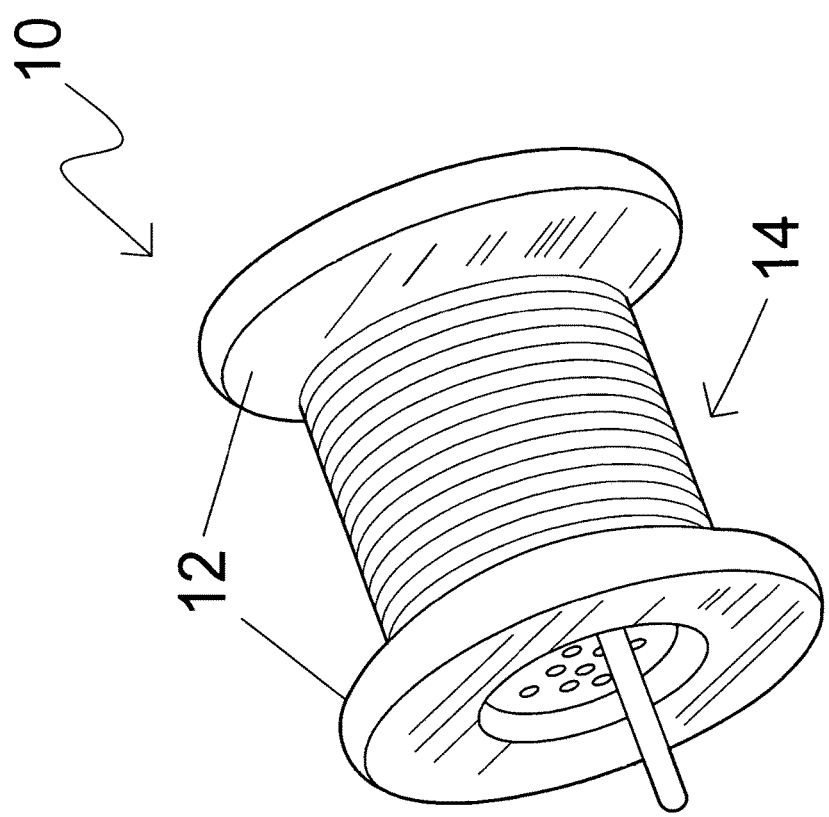
FIG. 4 is a top perspective view of a pet toy according to a first alternate embodiment of the present invention.
Figure 5:
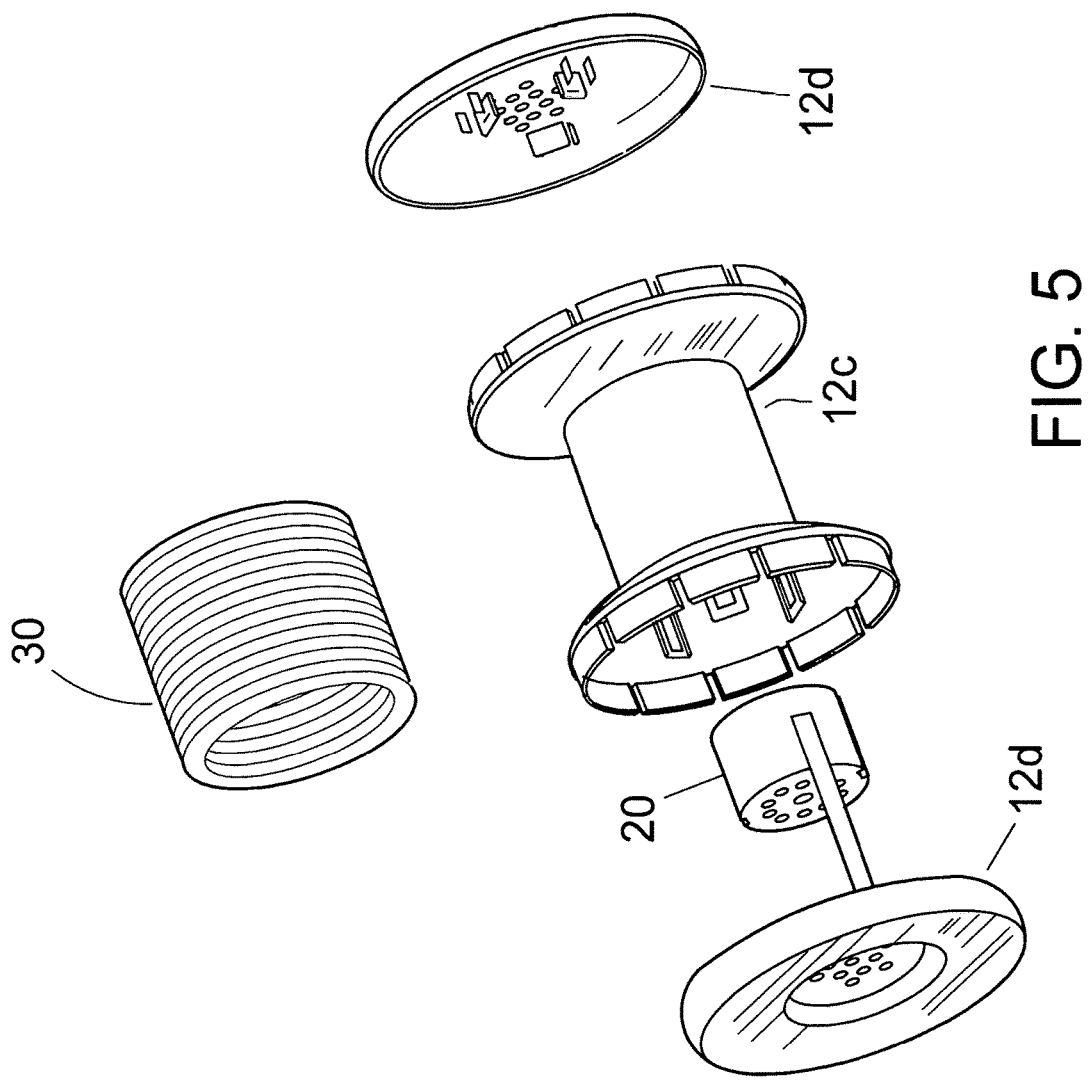
FIG. 5 is an exploded perspective view thereof.
Figure 6:
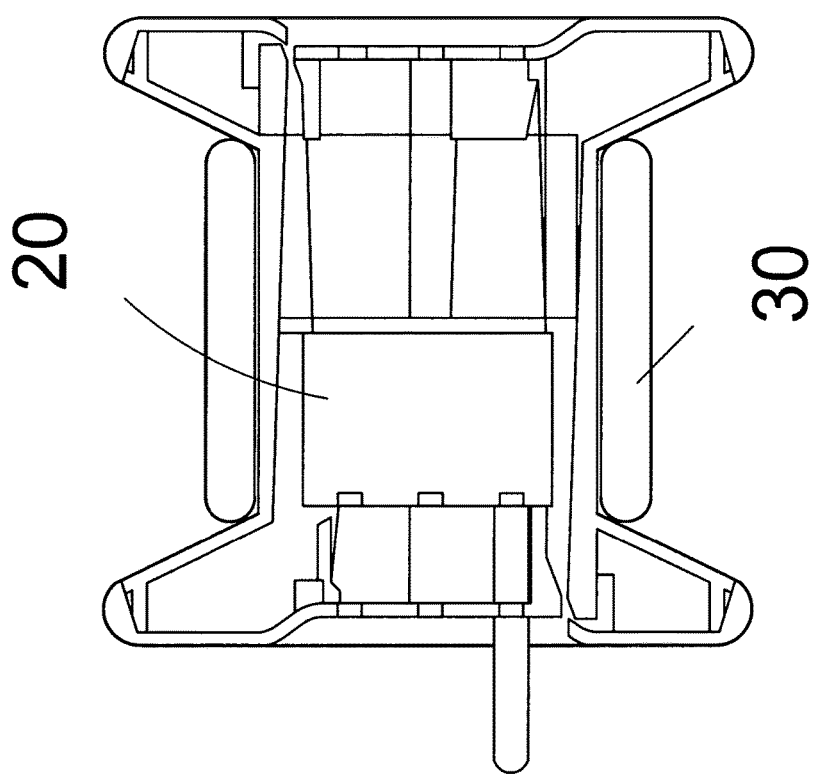
FIG. 6 is a cross sectional view taken along a linear centerline thereof.
Figure 7:
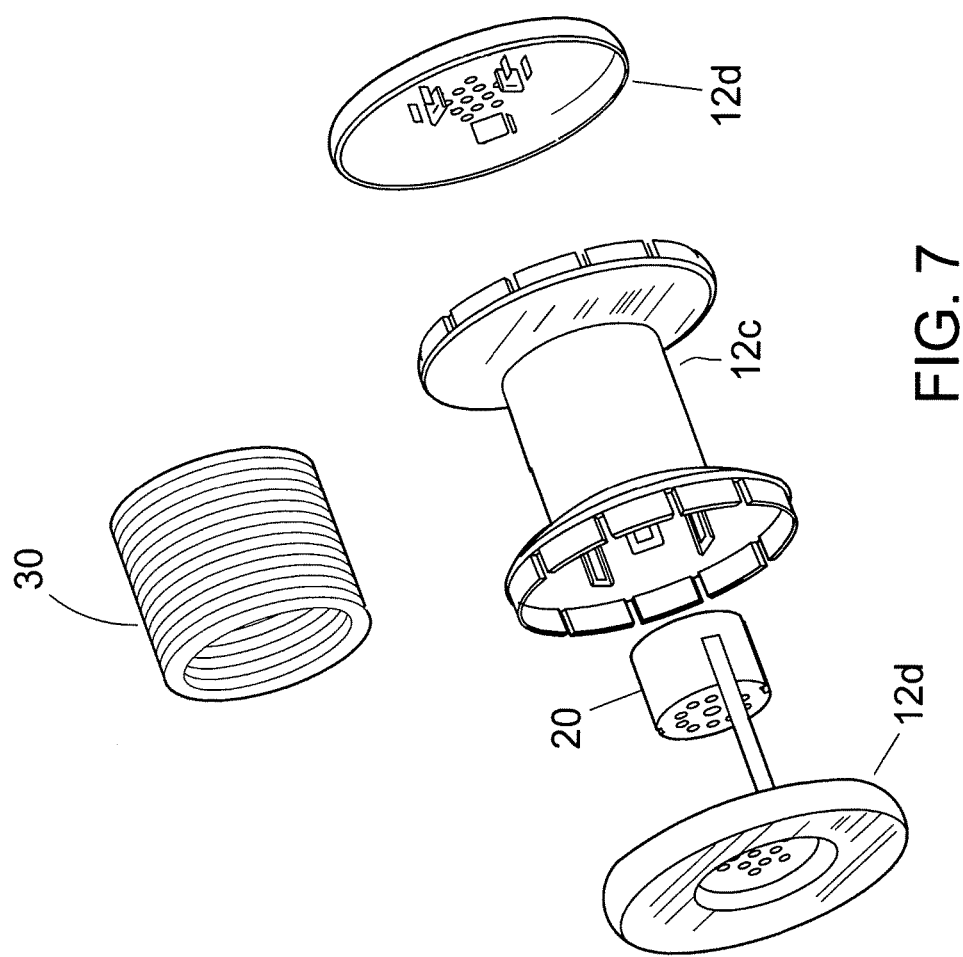
FIG. 7 is an alternate exploded perspective view of the first alternate embodiment of the present invention.
Figure 8:
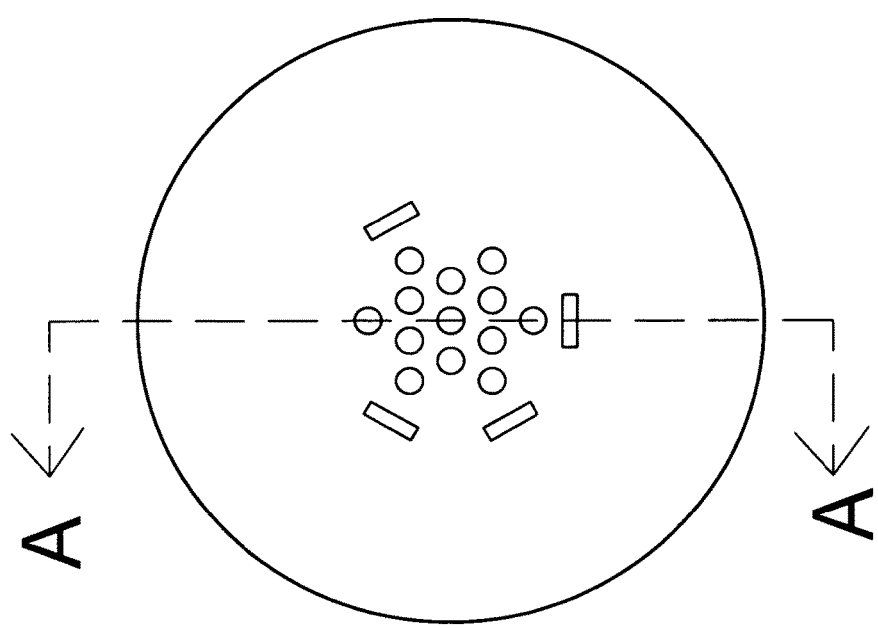
FIG. 8 is a front elevational view thereof.
Figure 9:
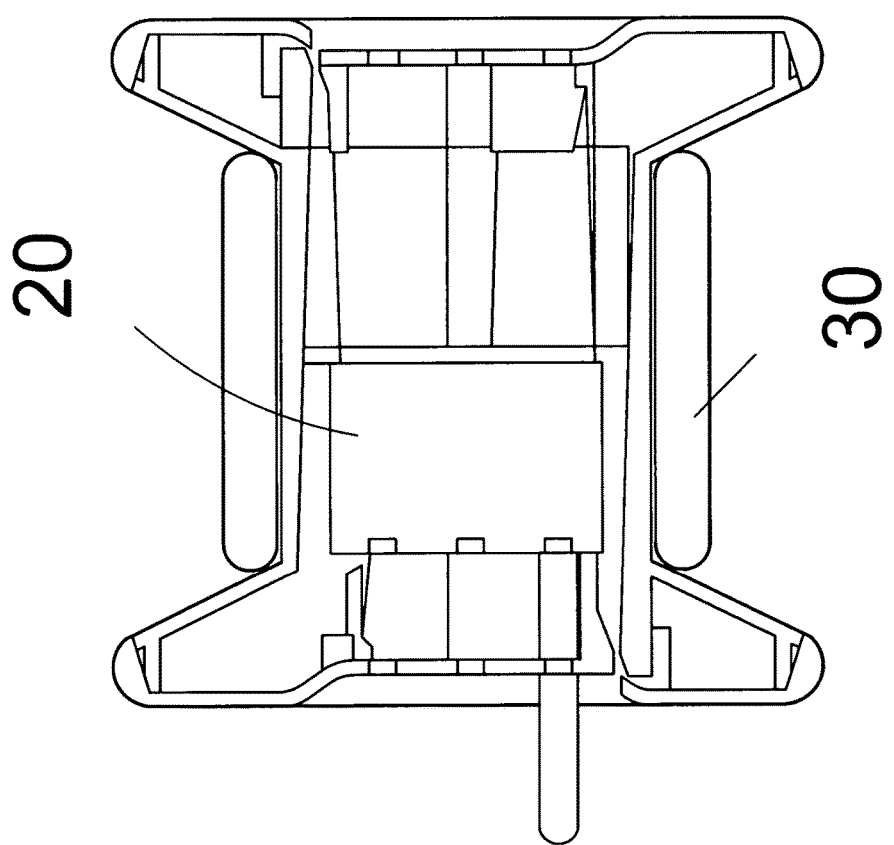
FIG. 9 is a cross sectional view taken along section A-A of FIG. 8.
Figure 10:
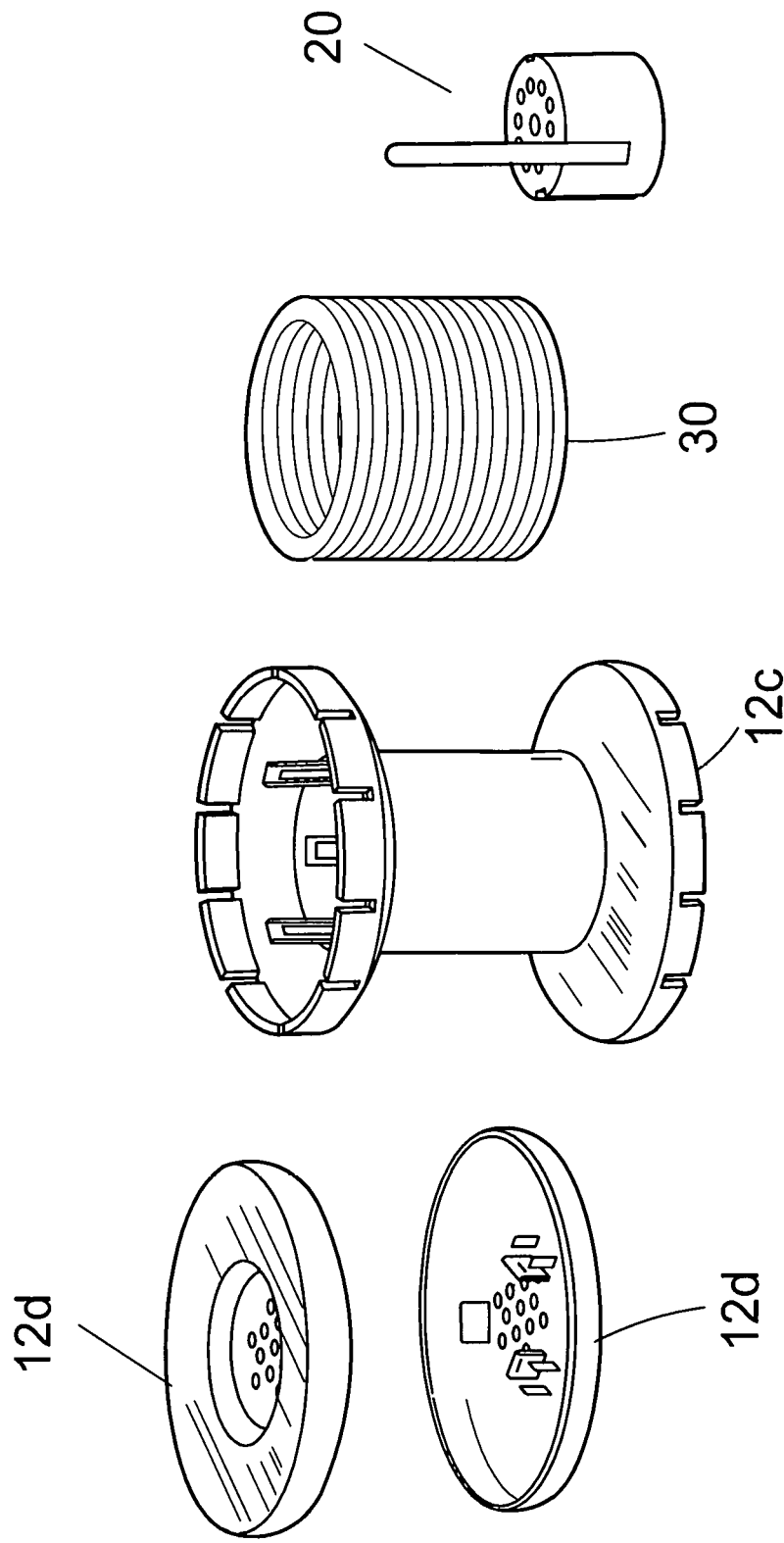
FIG. 10 is a three dimensional rendering of an exploded view of the first alternate embodiment of the present invention.

Referring now to FIG. 1-10, an interactive pet toy, generally noted as 10, is provide having a housing body 12 in the form of a thread spool configuration having a cylindrical center terminated at each end by a disc flange. As shown in conjunction with FIG. 1-3, the housing body 12 is shown in a preferred embodiment formed of two housing half sections 12a, 12b that lock together to form a thread spool shape, with the connection half sections 12a, 12b connecting to form the cylindrical center 14. The cylindrical center 14 forms an outer sidewall 15 that is recessed along its length and is terminated at each end by disc flange 16 to form an overall length "L". Each flange 16 may be identically and symmetrically shaped. Each disc flange 16 may further extend radially outward from the outer sidewall 15 to form an overall diameter "D". As shown in conjunction with FIG. 4-10, a first alternate embodiment is shown in which the housing body 12 is formed as three separate parts, a middle 12c and two end caps 12d. In either variant, a cylindrical center 14 forms a containment volume 16 in which an interactive sound element 20 may be contained. Additionally, in either embodiment attractants such as catnip or the like may be placed within and dispensed from the containment volume. The outer surface of the cylindrical center 14 may be covered with a tactile sleeve 30 formed of carpet, fabric, sisal, corrugated cardboard, jute, sea grass, cork, or similar material known to function as claw scratcher elements. Catnip or similar attractant may further be incorporated into the sleeve as a composite material.

Figure 11:
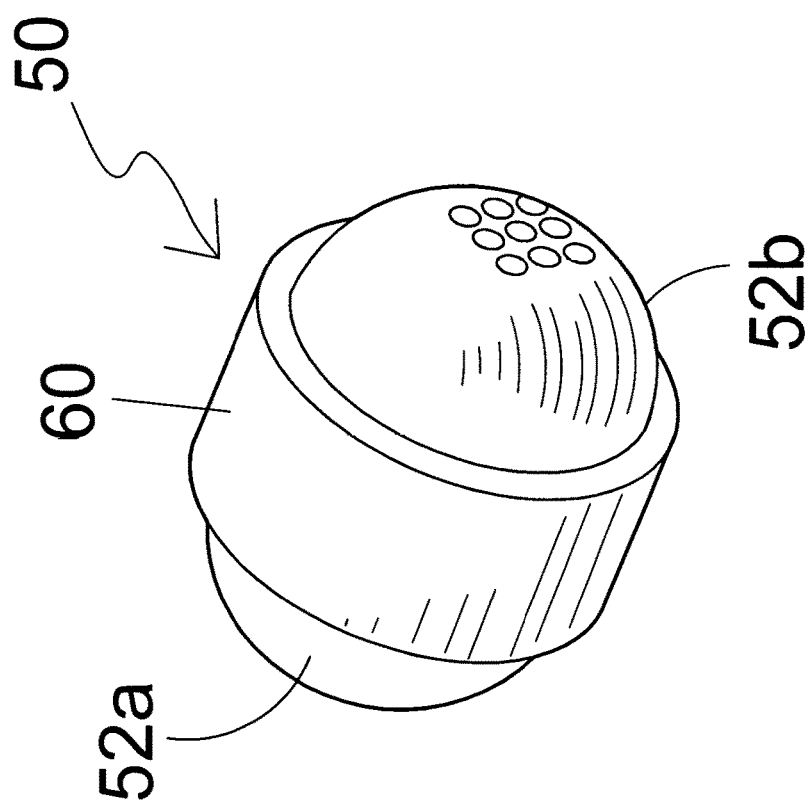
FIG. 11 is a top perspective view of a pet toy according to a second alternate embodiment of the present invention.
Figure 12:
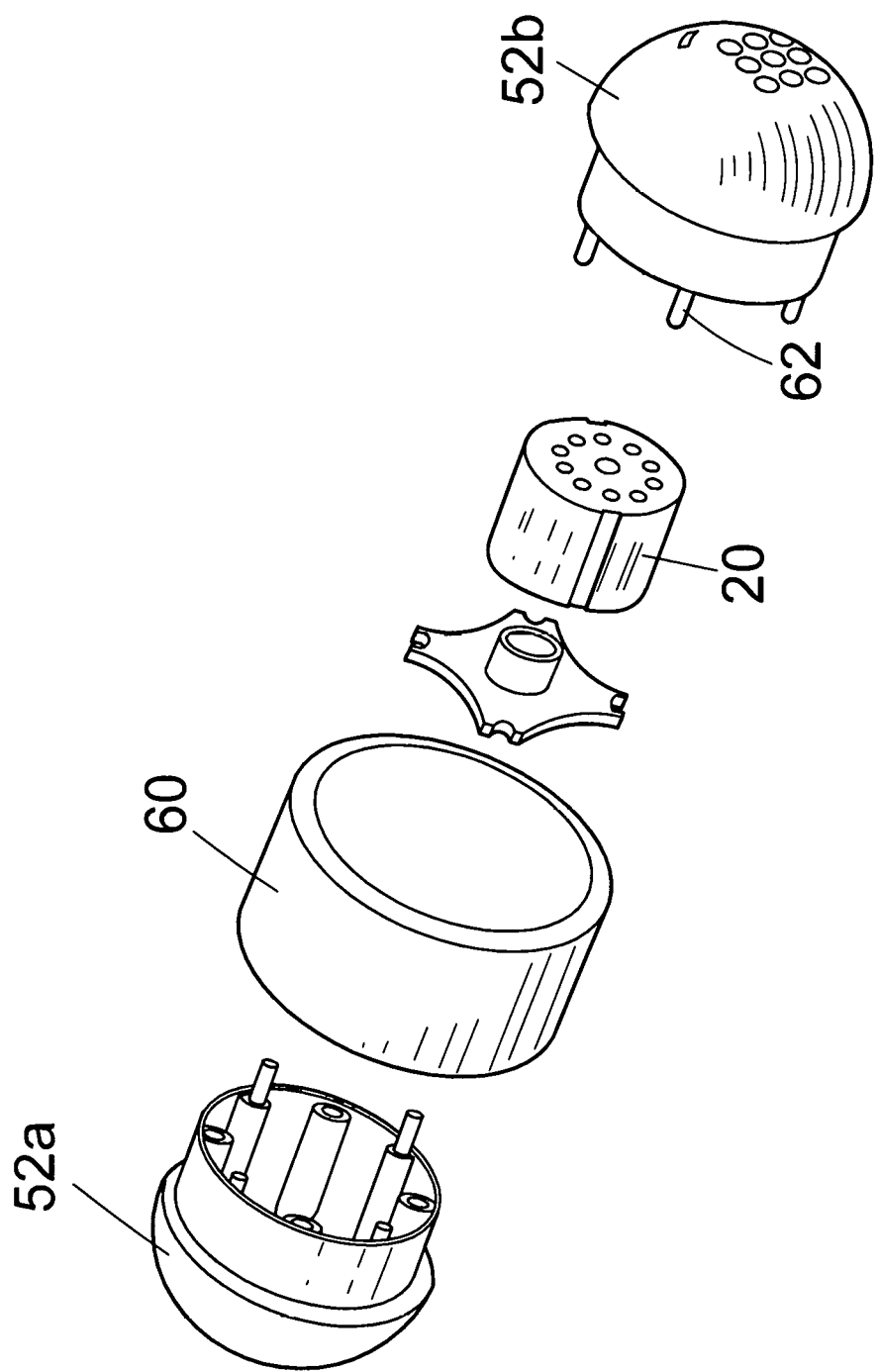
FIG. 12 is an exploded perspective view thereof.
Figure 13:
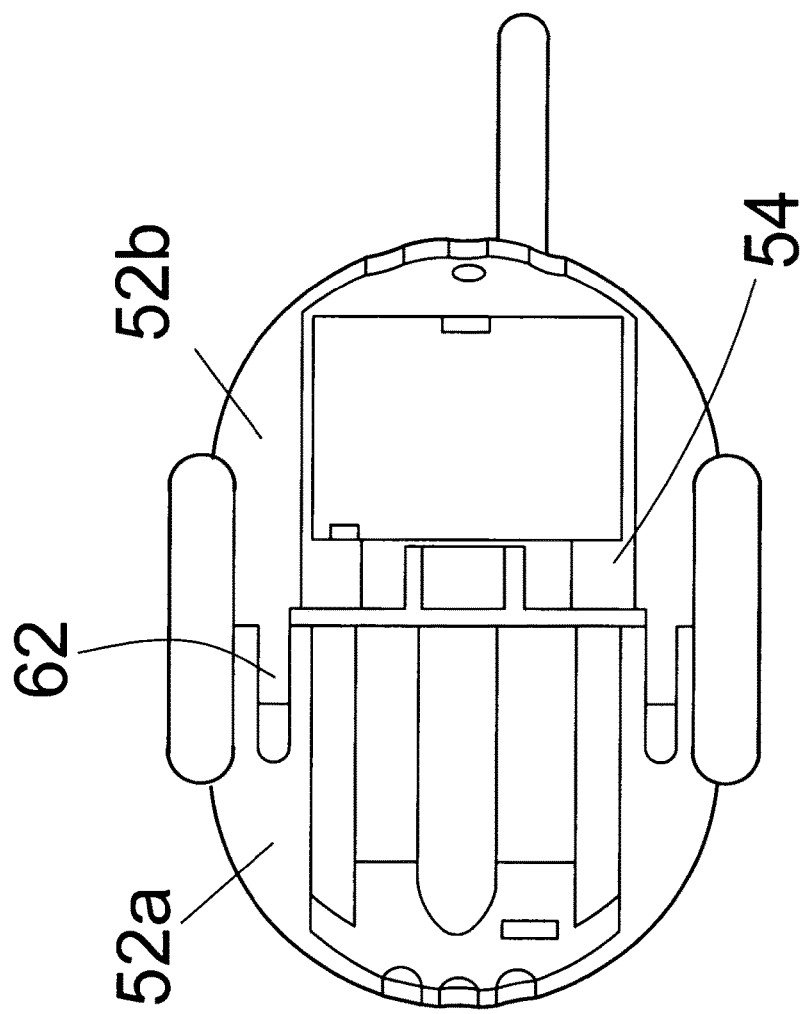
FIG. 13 is a cross sectional view taken along a linear centerline thereof.
Figure 14:
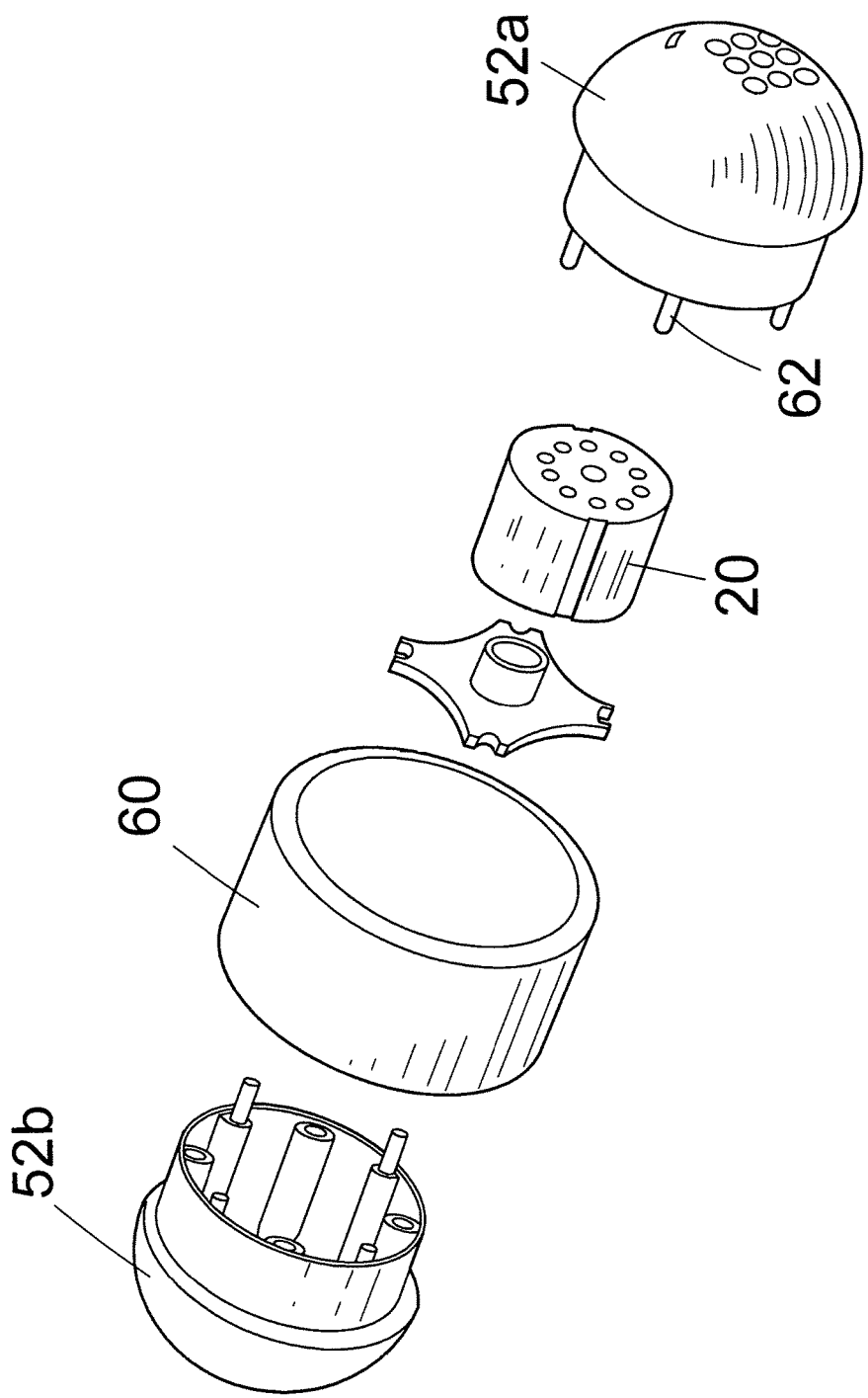
FIG. 14 is an alternate exploded perspective view of the second alternate embodiment of the present invention.
Figure 15:
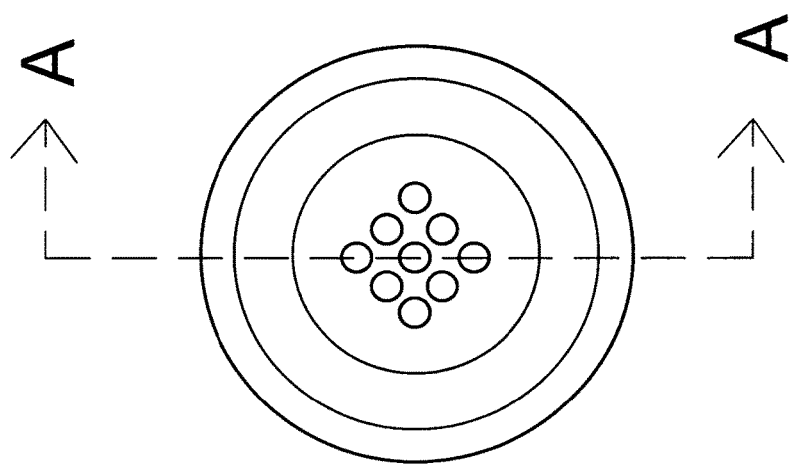
FIG. 15 is a front elevational view thereof.
Figure 16:
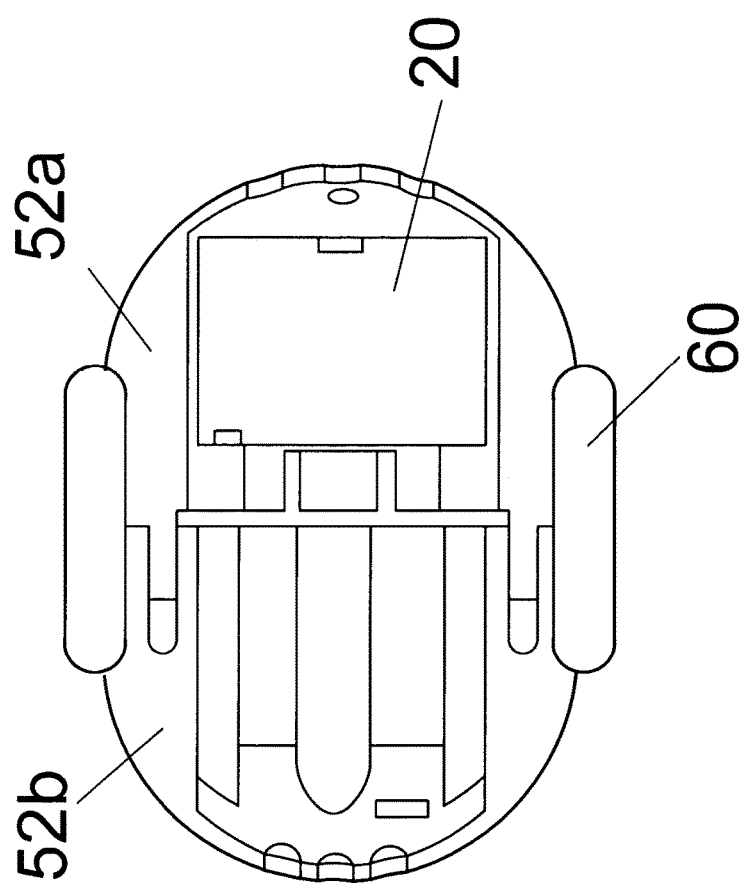
FIG. 16 is a cross sectional view taken along line A-A of FIG. 15.
Figure 17:
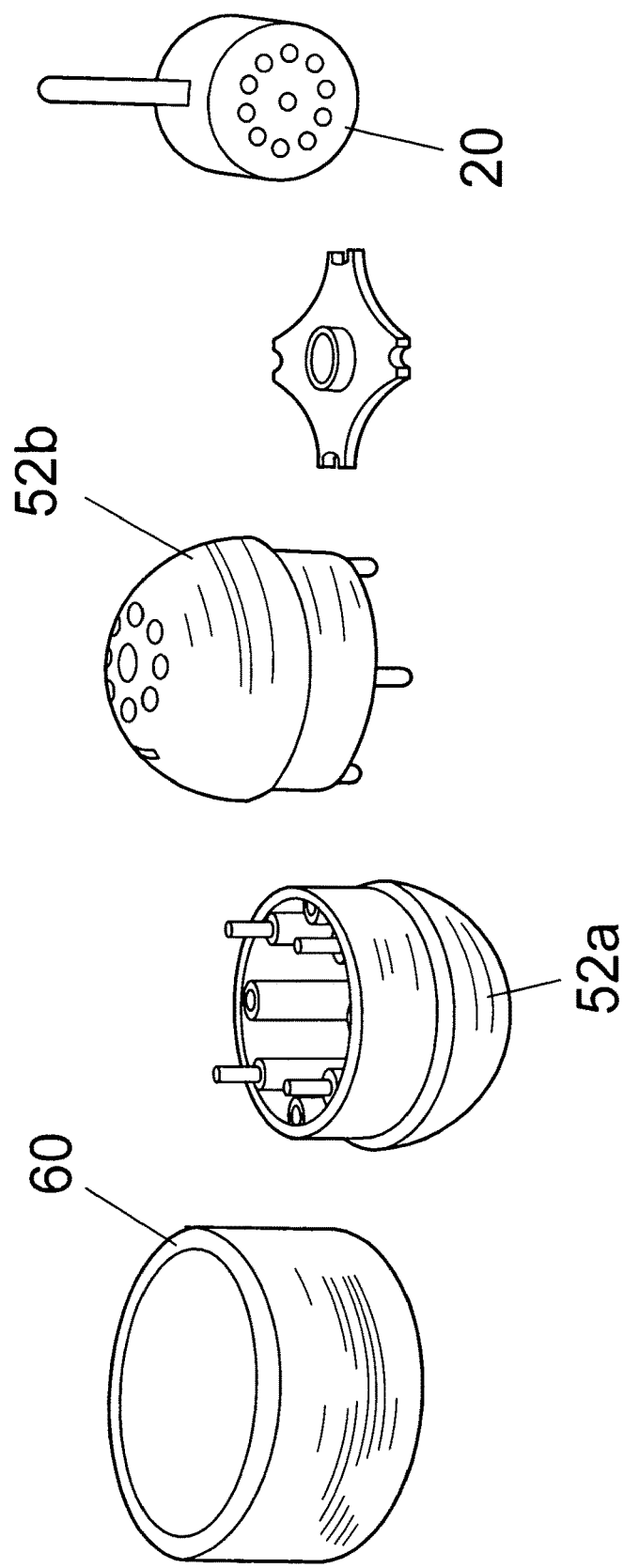
FIG. 17 is three dimensional rendering of an exploded view of the second alternate embodiment of the present invention.

Referring now in conjunction with FIG. 11-17, an interactive pet toy, generally noted as 50, is provide in a second alternate embodiment and having a housing body 52 in the form of an egg-like configuration having a cylindrical center terminated at each end by a hemispherical dome 52a, 52b. The cylindrical center forms a containment volume 54 in which the interactive sound element 20 may be contained. Additionally, attractants such as catnip or the like (not shown) may be placed within and dispensed from the containment volume 54. The outer surface of the cylindrical center may be covered with a tactile sleeve 60 formed of carpet, fabric, sisal, corrugated cardboard, jute, sea grass, cork, or similar material known to function as claw scratcher elements. Catnip or similar attractant may further be incorporated into the sleeve as a composite material.

A bayonet lock 62 may be used to snap together the module halves 52a, 52b. The sound module 20 is preferably of a type that may be actuate by a momentum switch in which sound is generated upon movement of the toy 10, 50 and causing continued interaction stimulus for the pet.

2. Operation of the Preferred Embodiment

In operation, a user activates the sound module 20 and provides a rolling interactive toy for engagement with a pet. An attractant such as catnip may be loaded within the housing volume, for additional stimulation of the pet.

Interaction with a pet will result in the motion of the ball to allow for edible treats to dispense randomly from the "holes" in the dome. Additionally, the interactively generated sound will greatly stimulate the small rodent hunting instincts of domestic felines and some canine breeds.

Additionally, other interactive stimulation is anticipated as being incorporated in conjunction with the visual stimulation provided, such as the incorporation of a sound device that preferably emits a prerecorded sound in response to movement or propulsion/retraction of the pet. This prerecorded sound can be a "permanent" prerecorded sound such as an animal's voice, such as "meow" or "purr,' a beeping sound, a human voice, laughter, such as "ha, ha, ha" or some other desired sound, or can be recorded, and re-recorded, as desired, by the user. The prerecorded sound may continue for a predetermined time period, for example five (5) seconds, and then stops or may continue as long as the sound device is sensing motion of pet. Preferably, the sound simulates a natural prey of the pet, the pre-recorded sound is a simulated sound being reflective of the sound made by the natural prey, i.e., squeak for a mouse or chirp for a bird.

The foregoing descriptions of specific embodiments of the present invention are presented for purposes of illustration and description. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contem plated. It is intended that a scope of the invention be defined broadly by the Drawings and Specification appended hereto and to their equivalents. Therefore, the scope of the invention is in no way to be limited only by the following exemplary claims nor by any possible, adverse inference under the rulings of *Warner-Jenkinson Company, v. Hilton Davis Chemical*, 520 US 17 (1997) or *Festo Corp. V. Shoketsu Kinzoku Kogyo Kabushiki Co.*, 535 U.S. 722 (2002), or other similar caselaw or subsequent precedent should not be made if such claims are amended subsequent to this Patent Application.

What is claimed is:

1. An interactive pet toy comprising:
   a housing body in the form of a thread spool configuration further comprising:
      a cylindrical center having a recessed outer sidewall and terminated at each end by an identically shaped disc flange radially extended past said outer sidewall, said housing of a first housing half section locked together with a second housing half section and forming the spool configuration having an overall length approximately equal to a flange diameter;
   a containment volume formed within the cylindrical center of said housing body when assembled; and
   an interactive sound producing element retained within said containment volume.

2. The pet toy of claim 1, wherein said sound producing element is capable of generating an electronically produced noise that is initiated upon motion of the pet toy.

3. The pet toy of claim 1, further comprising:
   at least one egress orifice formed in at least one said disc flange at a location away from an outer circumference of the disc flange and positioned within a radius aligned within said outer sidewall; and
   a solid attractants placed said containment volume and dispensed from said egress orifice.

4. The pet toy of claim 3, wherein said egress orifice provides fluid communication outward from said containment volume and said solid attractant comprises catnip.

5. The pet toy of claim 2, further comprising:
   at least one egress orifice formed in at least one said disc flange at a location away from an outer circumference of the disc flange and positioned within a radius aligned within said outer sidewall; and
   a solid attractants placed said containment volume and dispensed from said egress orifice.

6. The pet toy of claim 5, wherein said egress orifice provides fluid communication outward from said containment volume and said solid attractant comprises catnip.

7. The pet toy of claim 1, wherein said cylindrical center is substantially covered with a tactile sleeve covering said outer sidewall capable of functioning as a claw scratcher elements covering an outer surface of said cylindrical center.

8. The pet toy of claim 7, wherein said tactile sleeve further includes an outer surface covering that is selected from the group consisting of: carpet; fabric; sisal; corrugated cardboard; jute; sea grass; cork.

9. The pet toy of claim 2, wherein said sound producing element further comprises an electronic sound generator that emit a prerecorded sound in response to movement.

10. The pet toy of claim 9, wherein once initiated said prerecorded sound is played for a predetermined time period and then stops.

11. The pet toy of claim 9, wherein said prerecorded sound continue to play as long as the sound device is sensing motion of the pet toy.

12. The pet toy of claim 9, wherein said prerecord sound simulates a natural prey animal.

13. The pet toy of claim 12, wherein said prerecorded sound simulates a squeak of a mouse or a chirp of a bird.

14. The pet toy of claim 5, wherein said sound producing element further comprises an electronic sound generator that emit a prerecorded sound in response to movement.

15. The pet toy of claim 14, wherein once initiated said prerecorded sound is played for a predetermined time period and then stops.

16. The pet toy of claim 14, wherein said prerecorded sound continue to play as long as the sound device is sensing motion of the pet toy.

17. The pet toy of claim 14, wherein said prerecord sound simulates a natural prey animal.

18. The pet toy of claim 17, wherein said prerecorded sound simulates a squeak of a mouse or a chirp of a bird.

\* \* \* \* \*